United States Patent
Miki et al.

(10) Patent No.: US 11,722,614 B2
(45) Date of Patent: Aug. 8, 2023

(54) IMAGE FORMING APPARATUS AND NON-TRANSITORY COMPUTER READABLE MEDIUM

(71) Applicant: FUJIFILM BUSINESS INNOVATION CORP., Tokyo (JP)

(72) Inventors: Masayoshi Miki, Kanagawa (JP); Teiju Sato, Kanagawa (JP); Masato Saito, Kanagawa (JP); Yasuhiro Nakatani, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 378 days.

(21) Appl. No.: 16/849,077

(22) Filed: Apr. 15, 2020

(65) Prior Publication Data

US 2021/0127026 A1    Apr. 29, 2021

(30) Foreign Application Priority Data

Oct. 29, 2019 (JP) ................. 2019-196298

(51) Int. Cl.
*G06F 3/12* (2006.01)
*H04N 1/00* (2006.01)

(52) U.S. Cl.
CPC ....... *H04N 1/00697* (2013.01); *H04N 1/0049* (2013.01); *H04N 1/00689* (2013.01); *H04N 1/00692* (2013.01); *H04N 1/00755* (2013.01); *H04N 1/00896* (2013.01)

(58) Field of Classification Search
CPC ............. H04N 1/00697; H04N 1/0049; H04N 1/00689; H04N 1/00692; H04N 1/00755; H04N 1/00896
See application file for complete search history.

(56) References Cited

U.S. PATENT DOCUMENTS

| | | | |
|---|---|---|---|
| 2006/0210336 A1* | 9/2006 | Horiguchi | B65H 31/3063 399/405 |
| 2009/0153916 A1* | 6/2009 | Borsuk | H04N 1/00641 358/474 |
| 2017/0088387 A1* | 3/2017 | Arikawa | B65H 43/06 |

FOREIGN PATENT DOCUMENTS

| | | |
|---|---|---|
| JP | H11-119600 A | 4/1999 |
| JP | 2006-001085 A | 1/2006 |
| JP | 2006-180397 A | 7/2006 |

(Continued)

OTHER PUBLICATIONS

May 30, 2023 Office Action issued in Japanese Patent Application No. 2019-196298.

*Primary Examiner* — Moustapha Diaby
(74) *Attorney, Agent, or Firm* — Oliff PLC

(57) ABSTRACT

An image forming apparatus includes an image forming unit, an output unit, a light source, and a processor. The image forming unit creates a printed material by forming an image on paper. The output unit outputs the printed material to an output tray. The light source is provided such that lit light is viewable from outside the image forming apparatus. The processor is configured to receive a print job for creating the printed material by the image forming unit, and perform control such that the light source is lit in a first lighting pattern in a case where a printed material of a print job for a single user has been output to the output tray and the light source is lit in a second lighting pattern in a case where printed materials of print jobs for multiple users have been output to the output tray.

17 Claims, 16 Drawing Sheets

(56) References Cited

FOREIGN PATENT DOCUMENTS

| | | | | |
|---|---:|---|---|---:|
| JP | 2006180397 | A | * | 7/2006 |
| JP | 2006-259194 | A | | 9/2006 |
| JP | 2009-96149 | A | | 5/2009 |
| JP | 2009096149 | A | * | 5/2009 |
| JP | 2010-069660 | A | | 4/2010 |
| JP | 2016-215443 | A | | 12/2016 |
| JP | 2017-65070 | A | | 4/2017 |
| JP | 2017-65828 | A | | 4/2017 |
| JP | 2017-85527 | A | | 5/2017 |

* cited by examiner

IMAGE FORMING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-196298 filed Oct. 29, 2019.

BACKGROUND

(i) Technical Field

The present disclosure relates to an image forming apparatus and a non-transitory computer readable medium.

(ii) Related Art

Recently, a printer that, by turning on light, notifies a user that a printed material has been output has been suggested (for example, Japanese Unexamined Patent Application Publication No. 2006-1085).

A printer described in Japanese Unexamined Patent Application Publication No. 2006-1085 includes a plurality of paper output trays for different colors, sign poles that emit light of colors corresponding to the paper output trays, and a controller that causes a sign pole to emit light of a color corresponding to a paper output tray to which a printed material has been output.

SUMMARY

Aspects of non-limiting embodiments of the present disclosure relate to providing an image forming apparatus and a non-transitory computer readable medium that prevent a user from incorrectly picking up a printed material for a different user in a case where printed materials for multiple users have been output to a paper output tray, compared to a configuration in which a user is notified that a printed material has been output without any distinction between a case where a printed material for a single user has been output and a case where printed materials for multiple users have been output.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including an image forming unit, an output unit, a light source, and a processor. The image forming unit creates a printed material by forming an image on paper. The output unit outputs the printed material to an output tray. The light source is provided such that lit light is viewable from outside the image forming apparatus. The processor is configured to receive a print job for creating the printed material by the image forming unit, and perform control such that the light source is lit in a first lighting pattern in a case where a printed material of a print job for a single user has been output to the output tray and the light source is lit in a second lighting pattern in a case where printed materials of print jobs for multiple users have been output to the output tray.

BRIEF DESCRIPTION OF THE DRAWINGS

Exemplary embodiments of the present disclosure will be described in detail based on the following figures, wherein.

DETAILED DESCRIPTION

Figure 1:
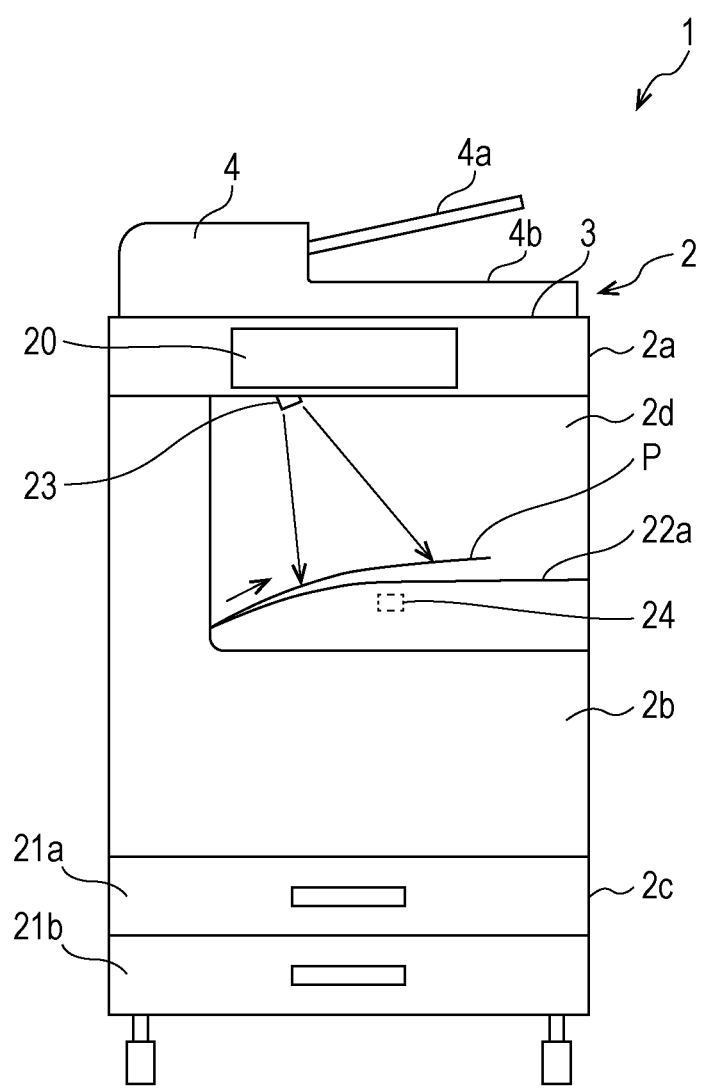
FIG. 1 is an external view illustrating a schematic configuration example of an image forming apparatus according to a first exemplary embodiment of the present disclosure.

Exemplary embodiments of the present disclosure will be explained below with reference to drawings. In the drawings, components having substantially the same functions will be referred to with the same signs, and redundant explanation will be omitted.

SUMMARY OF EXEMPLARY EMBODIMENTS

An image forming apparatus according to an exemplary embodiment includes an image forming unit that creates a printed material by forming an image on paper, an output unit that outputs the printed material to an output tray, a light source that is provided such that lit light is viewable from outside the image forming apparatus, and a processor. The processor is configured to receive a print job for creating the printed material by the image forming unit and perform control such that the light source is lit in a first lighting pattern in a case where a printed material of a print job for a single user has been output to the output tray and the light source is lit in a second lighting pattern in a case where printed materials of print jobs for multiple users have been output to the output tray.

Print jobs include jobs for printing data received from an external apparatus via a network or a public network. More specifically, a job for printing data received, along with a printing instruction, from a terminal such as a personal computer (PC) owned by a user (hereinafter, simply referred to as "printing") and a job for printing data based on received e-mail or facsimile (hereinafter, simply referred to as "e-mail or facsimile") are included in print jobs.

A user is a person who is to receive a printed material. Hence, a case where printed materials of print jobs for multiple users have been output may represent a case where two or more users are to receive printed materials that have been output.

In the case where a print job for printing is generated, a user who is to receive a printed material is usually a person who has transmitted the print job (that is, a user who has issued a printing instruction from a terminal that the user owns). A situation in which multiple printed materials based on printing instructions from different terminals have been output may be regarded as a state in which two or more users are to receive the printed materials.

In the case where a print job for e-mail or facsimile is generated, a user who is to receive a printed material may be identified according to an e-mail address or a caller number of a transmission source. Hence, a situation in which multiple printed materials for different e-mail addresses or caller numbers of transmission sources have been output may be regarded as a state in which two or more users are to receive the printed materials. In the case where multiple facsimile reception numbers are able to be set for an image forming apparatus, a situation in which different facsimile reception numbers are designated as destinations may be regarded as a state in which two or more users are to receive corresponding printed materials. The same applies to e-mail. Obviously, a situation in which printed materials based on different types of print jobs (printing, e-mail, and facsimile) have been output in a mixed manner may be regarded as a state in which two or more users are to receive the printed materials.

Lighting patterns include colors such as yellow and blue and light emission patterns such as solidly lit, flashing, and a lit time.

First Exemplary Embodiment

FIG. 1 is an external view illustrating a schematic configuration example of an image forming apparatus according to a first exemplary embodiment of the present disclosure. An image forming apparatus 1 is, for example, a multifunction apparatus including multiple functions such as a scanning function, a printing function, a copying function, an e-mail function, and a facsimile function. The image forming apparatus 1 may be an image forming apparatus including a single function such as a printing function or a facsimile function.

Furthermore, the image forming apparatus 1 includes an incorrect pickup prevention function, in addition to the functions mentioned above. The incorrect pickup prevention function is a function for preventing a user from incorrectly picking up a printed material for a different user in a case where printed materials for multiple users have been output to a paper output tray.

The image forming apparatus 1 includes an apparatus body 2. The apparatus body 2 includes, in an upper part 2a, a platen 3 on which a document is placed and an automatic paper feeder 4 that automatically feeds a document to the platen 3. The automatic paper feeder 4 is provided so as to be openable in the upper part 2a of the apparatus body 2 and includes a document feeder tray 4a from which a document is fed and a document output tray 4b to which a document is output.

Furthermore, the apparatus body 2 includes, on a front side of the upper part 2a, an operation display unit 20. The apparatus body 2 includes, inside an intermediate part 2b, an image forming unit 14 that forms an image. The apparatus body 2 includes, in a lower part 2c, a plurality of paper feed cassettes 21a and 21b that feed paper. The apparatus body 2 includes, in a space 2d between the upper part 2a and the intermediate part 2b, a paper output tray 22a to which a printed material P is output. An upper part of the paper output tray 22a is covered with the upper part 2a. A lamp 23 that illuminates the paper output tray 22a is provided on the lower face of the upper part 2a. The lamp 23 illuminates the printed material P output to the paper output tray 22a that tends to be dark. A paper sensor 24 that detects the printed material P output to the paper output tray 22a is provided near the paper output tray 22a. The lamp 23 is an example of a light source. The upper part 2a is an example of part of the apparatus.

(Configuration of Lamp)

The lamp 23 includes a function for lighting up in at least two lighting patterns. Specifically, the lamp 23 includes a first light emission part 23a (see FIG. 2) that emits, for example, yellow light, a second light emission part 23b (see FIG. 2) that emits, for example, blue light, and a lens (not illustrated in FIG. 2) that collects light emitted from the first light emission unit 23a or the second light emission unit 23b.

The first light emission part 23a includes a blue light-emitting diode (LED) that emits blue light and a fluorescent substance that converts blue light into yellow light. The second light emission unit 23b includes a blue LED that emits blue light.

Colors of light emitted from the lamp 23 are not necessarily the two colors mentioned above. The colors of light emitted from the lamp 23 may be colors other than the colors mentioned above and the lamp 23 may emit light in three or more lighting patterns. Furthermore, if the lamp 23 is able to emit light in a single color in two light emission patterns, for example, being solidly lit or flashing, the lamp 23 may include only one light emission unit.

The lamp 23 is arranged to illuminate a certain range, for example, with a diameter of about 10 cm, of a printed material P output to the paper output tray 22a. For example, the lamp 23 may be provided to be hidden by the lower face of the upper part 2a or may be provided on an upper face of the upper part 2a of the apparatus body 2 as long as lit light is able to be visually recognized from outside the image forming apparatus 1. Furthermore, the lamp 23 may be provided at a position away from the apparatus body 2, for example, may be provided on the ceiling or suspended from the ceiling.

(Configuration of Paper Sensor)

When detecting a printed material P output to the paper output tray 22a, the paper sensor 24 transmits a detection signal to a controller 10. The paper sensor 24 continuously transmits detection signals during the period in which a printed material P is present on the paper output tray 22a. When all printed materials P have been picked up from the paper output tray 22a, the paper sensor 24 stops transmission of detection signals.

As the paper sensor 24, for example, a reflective light emitting and receiving unit that includes a light-emitting element and a light-receiving element that are arranged in the same direction or a transmissive light emitting and receiving unit that includes a light-emitting element and a light-receiving element that is arranged correspondingly to the light-emitting element may be used.

Figure 2:
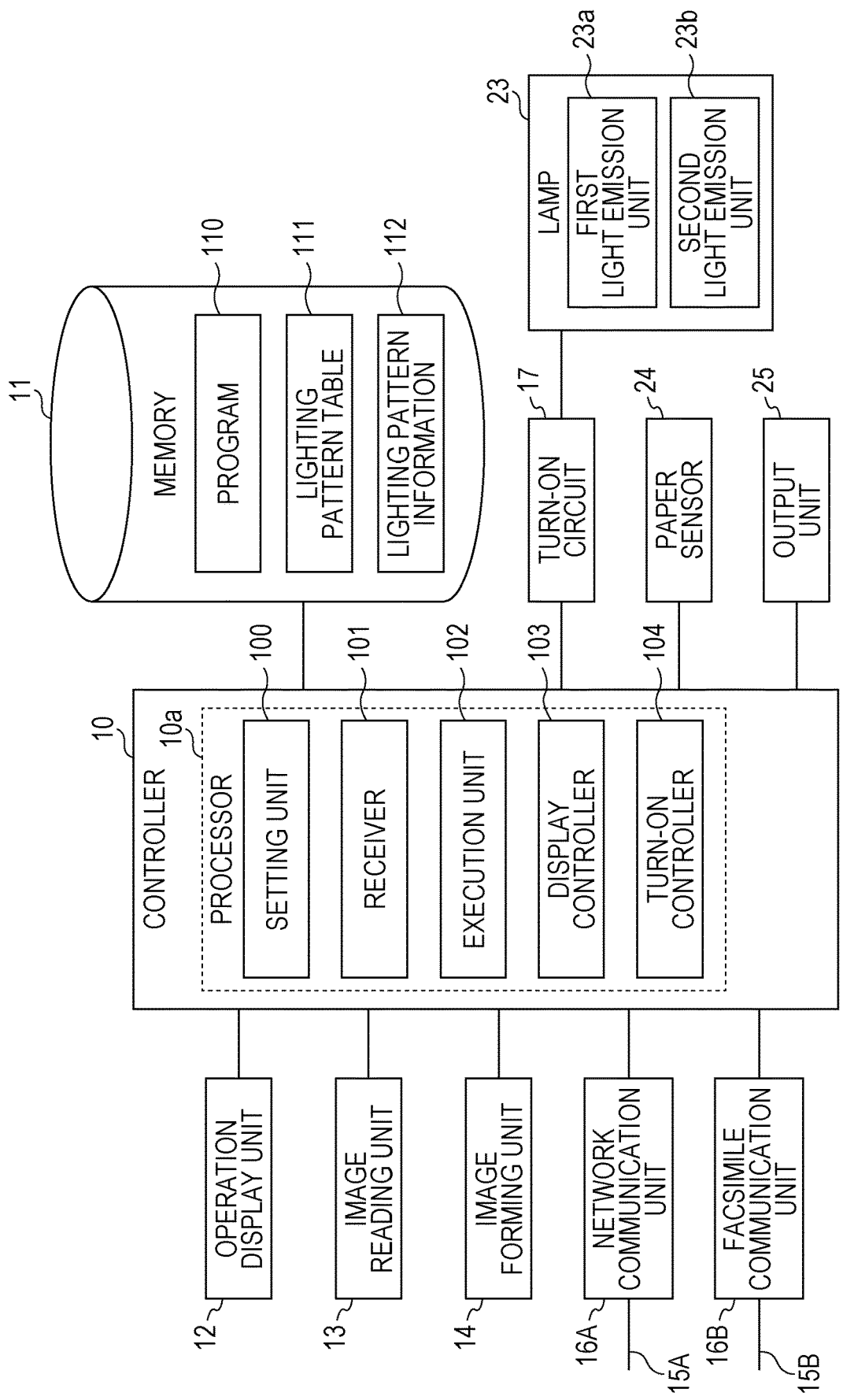
FIG. 2 is a block diagram illustrating an example of a control system of an image forming apparatus.

FIG. 2 is a block diagram illustrating an example of a control system of the image forming apparatus 1. The image forming apparatus 1 includes the controller 10 that controls units of the image forming apparatus 1. A memory 11, an operation display unit 12, an image reading unit 13, an image forming unit 14, a network communication unit 16A, a facsimile communication unit 16B, a turn-on circuit 17, the paper sensor 24, and an output unit 25 are connected to the controller 10.

The controller 10 includes a processor 10a such as a central processing unit (CPU), an interface, and so on. The processor 10a functions as a receiver 101, an execution unit 102, a display controller 103, a turn-on controller 104, and so on when executing a program 110 stored in the memory 11. The details of a setting unit 100, the receiver 101, the execution unit 102, the display controller 103, and the turn-on controller 104 will be described later.

The memory 11 includes a read only memory (ROM), a random access memory (RAM), a hard disk, and so on and stores various types of information such as the program 110, a lighting pattern table 111 (see FIG. 3), and lighting pattern information 112. The lighting pattern information 112 is an example of a lighting pattern.

The operation display unit 12 inputs and displays information. The operation display unit 12 is, for example, a touch panel display and has a configuration in which a touch panel is superimposed on a display such as a liquid crystal display.

The image reading unit 13 includes the automatic paper feeder 4 provided on the platen 3 and a scanner (not illustrated in FIG. 1). The image reading unit 13 optically reads a document image from a document arranged on the platen 3 or a document transmitted by the automatic paper feeder 4.

The image forming unit 14 creates a printed material P by forming an image on paper fed from the paper feed cassette 21a or 21b using, for example, an electrophotographic system, an inkjet system, or the like.

A network 15A is a communication network such as, for example, a local area network (LAN) or the Internet.

The network communication unit 16A communicates with an external apparatus such as a user terminal via the network 15A in accordance with a communication protocol such as transmission control protocol/Internet protocol (TCP/IP). The network communication unit 16A receives a print job for printing and a print job for e-mail from the external apparatus.

The facsimile communication unit 16B modulates and demodulates data in accordance with a facsimile protocol such as G3 or G4 and communicates with an external apparatus such as a facsimile apparatus, an image forming apparatus, and the like via a public network 15B. The facsimile communication unit 16B receives a print job for facsimile from the external apparatus.

When a turn-on signal is transmitted from the controller 10, the turn-on circuit 17 turns on the lamp 23. When a turn-off signal is transmitted from the controller 10, the turn-on circuit 17 turns off the lamp 23. Specifically, when a first turn-on signal is transmitted from the controller 10, the turn-on circuit 17 causes the first light emission part 23a of the lamp 23 to be lit in a lighting pattern indicating that a printed material of a print job for a single user has been output to the paper output tray 22a (hereinafter, also referred to as a "single job pattern"). When a second turn-on signal is transmitted from the controller 10, the turn-on circuit 17 causes the second light emission unit 23b of the lamp 23 to be lit in a lighting pattern indicating that printed materials of print jobs for multiple users have been output to the paper output tray 22a (hereinafter, also referred to as a "multiple job pattern"). The single job pattern is an example of a first lighting pattern, and the multiple job pattern is an example of a second lighting pattern.

When the first turn-on signal is transmitted, the turn-on circuit 17 causes the first light emission part 23a of the lamp 23 to be lit in yellow as the single job pattern. When the second turn-on signal is transmitted, the turn-on circuit 17 causes the second light emission unit 23b of the lamp 23 to be lit in blue as the multiple job pattern.

As the lighting pattern information 112, any one of the single job pattern and the multiple job pattern is stored into the memory 11 by the turn-on controller 104, which will be described later.

The lighting pattern information 112 includes colors and light emission patterns. The colors include yellow, blue, and the like. The light emission patterns include being lit, which means being solidly lit, flashing, a lit time, and the like. Flashing includes different lengths of lit intervals or different lit times. For example, flashing includes "fast flashing" with relatively short lit intervals (for example, about 0.5 seconds), "slow flashing" with relatively long lit intervals (for example, about one second), "breathing" with lit intervals longer than "slow flashing" (for example, about two seconds), and the like. In this exemplary embodiment, the single job pattern represents a yellow lighting pattern, and the multiple job pattern represents a blue lighting pattern.

The output unit 25 outputs a printed material P created by forming an image on paper by the image forming unit 14 under the control of the controller 10 to the paper output tray 22a.

Figure 3:
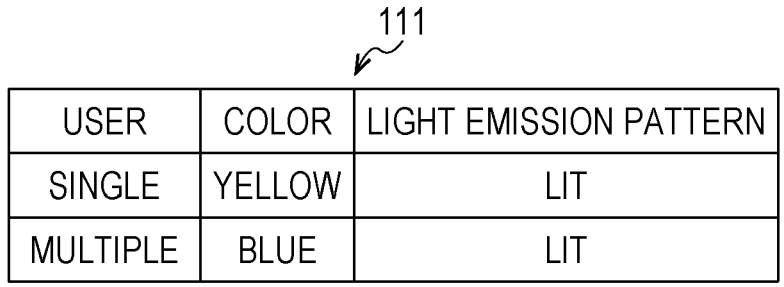
FIG. 3 is a diagram illustrating an example of a lighting pattern table.

FIG. 3 is a diagram illustrating an example of the lighting pattern table 111. The lighting pattern table 111 includes items such as "user", "color", and "light emission pattern". As the item "user", "single" representing a case where a printed material for a single user has been output to the paper output tray 22a and "multiple" representing a case where printed materials for multiple users have been output to the paper output tray 22a are recorded. As the item "color", "yellow" representing a case where the first light emission part 23a of the lamp 23 emits light and "blue" representing a case where the second light emission unit 23b of the lamp 23 emits light are recorded. As the item "light emission pattern", a light emission pattern set by the setting unit 100, which will be described later, for example, any light emission pattern from among "lit" representing being solidly lit, and "fast flashing", "slow flashing", and "breathing", which have different flashing intervals, is recorded.

Next, the components 100 to 104 of the controller 10 will be explained.

The setting unit 100 sets whether or not to enable the incorrect pickup prevention function, based on an operation by an administrator on administrator setting screens 120A to 120C (see FIG. 4), which will be described later. In the case where the incorrect pickup prevention function is enabled, the setting unit 100 sets light emission patterns for the single job pattern and the multiple job pattern. The setting unit 100 records light emission patterns for the single job pattern and the multiple job pattern selected on the administrator setting screens 120B and 120C as "light emission patterns" in the lighting pattern table 111. In this exemplary embodiment, two types of lighting patterns, the "single job pattern" and the "multiple job pattern", may be set as lighting patterns for the incorrect pickup prevention function.

The receiver 101 receives a print job for printing or e-mail transmitted from an external apparatus via the network 15A and the network communication unit 16A or a print job for facsimile transmitted from an external apparatus via the public network 15B and the facsimile communication unit 16B. The receiver 101 acquires, based on a received print job, a user ID for identifying a terminal or a user who has issued a printing instruction in the case of a print job for printing, an e-mail address of a transmission source or a transmission destination in the case of a print job for e-mail, and a telephone number (that is, a caller number or a receiver number) in the case of a print job for facsimile. The receiver 101 notifies the turn-on controller 104 of the acquired user ID, e-mail address, or telephone number.

The execution unit 102 controls the image forming unit 14 to execute a print job received by the receiver 101. At a time when outputting paper on which printing has been performed by the image forming unit 14 to the paper output tray 22a, the execution unit 102 notifies the turn-on controller 104 of an output signal indicating that the paper has been output.

The display controller 103 controls the operation display unit 12 to display various screens such as a menu screen and a setting screen.

The turn-on controller 104 determines identify of a user who is to receive a printed material notified from the receiver 101, based on a user ID, an e-mail address, or a telephone number of the user. Furthermore, when an output signal is transmitted from the execution unit 102, the turn-on controller 104 transmits a first turn-on signal corresponding to the single job pattern to the turn-on circuit 17 in the case where a printed material for a single user has been output to the paper output tray 22a, and transmits a second turn-on signal corresponding to the multiple job pattern to the turn-on circuit 17 in the case where printed materials for multiple users have been output to the paper output tray 22a.

(Operation of Image Forming Apparatus)

Next, an example of an operation of the image forming apparatus 1 will be explained with reference to FIGS. 4A to 4C and FIGS. 5 to 10.

(1) Setting for Incorrect Pickup Prevention Function

Figure 4A:
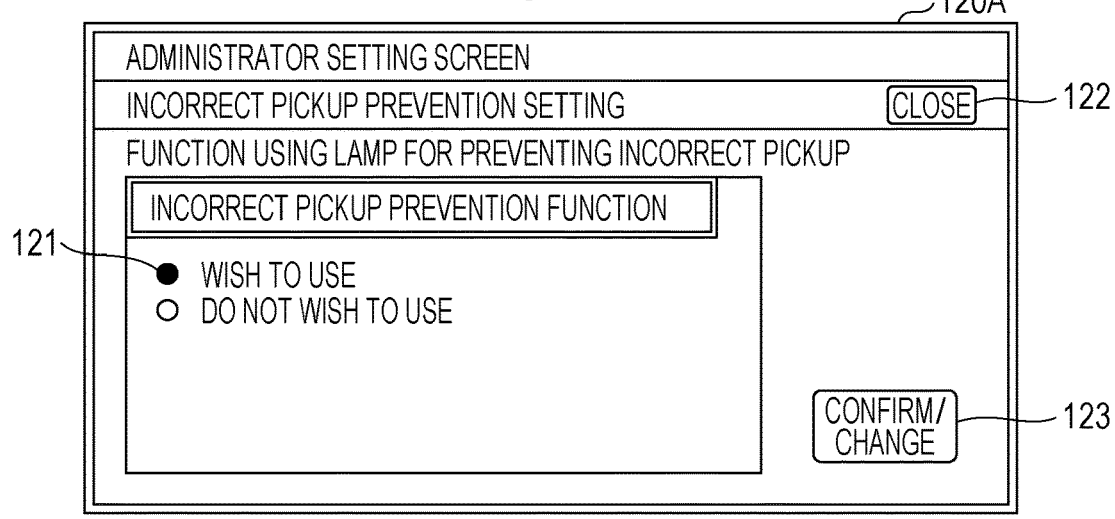
FIGS. 4A, 4B, and 4C are diagrams illustrating examples of an administrator setting screen.
Figure 4B:
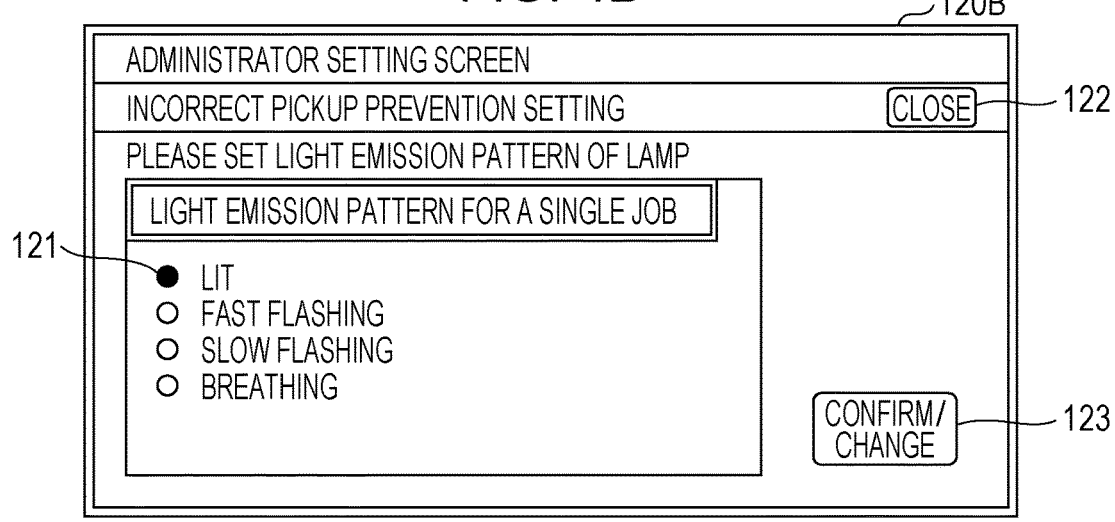
Figure 4C:
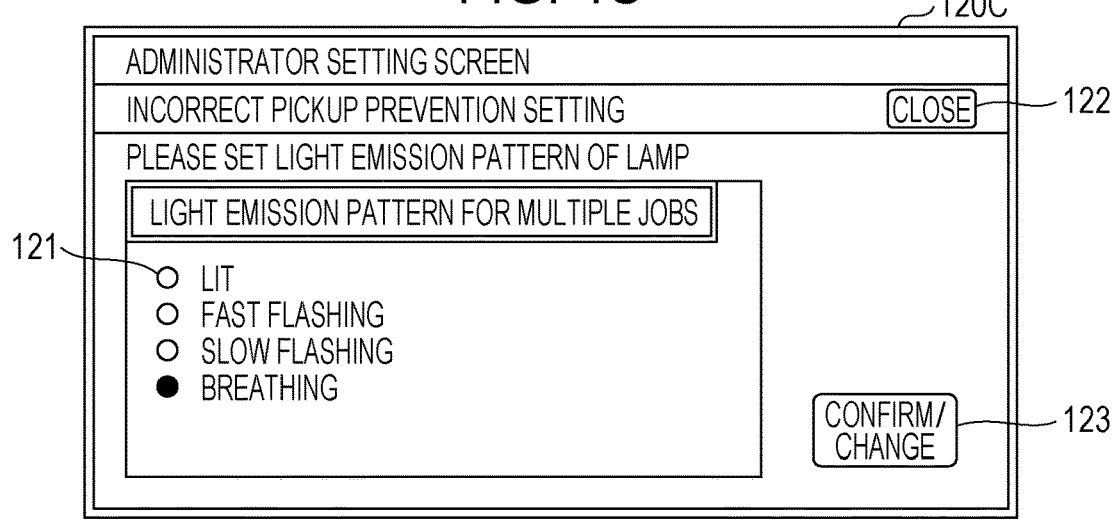

FIGS. 4A to 4C are diagrams illustrating examples of an administrator setting screen displayed on the operation display unit 12.

When an administrator operates the operation display unit 12 to make a request to display an administrator setting screen, the display controller 103 displays the administrator setting screen 120A illustrated in FIG. 4A on the operation display unit 12. On the administrator setting screen 120A, the administrator is able to select, using a radio button 121, "wish to use" or "do not wish to use" for the incorrect pickup prevention function. The administrator setting screen 120A includes a "close" button 122 for closing the screen and a "confirm/change" button 123 for confirming or changing the setting details.

When the administrator selects "wish to use" as illustrated in FIG. 4A, the setting unit 100 enables the incorrect pickup prevention function. When the administrator operates the "close" button 122, the display controller 103 displays the administrator setting screen 120B illustrated in FIG. 4B on the operation display unit 12.

The administrator setting screen 120B illustrated in FIG. 4B is associated with the single job pattern. On the administrator setting screen 120B, the administrator is able to select, using the radio button 121, any light emission pattern from among "lit", "fast flashing", "slow flashing", and "breathing".

When the administrator selects any one of the light emission patterns on the administrator setting screen 120B, the setting unit 100 records the selected light emission pattern as a "light emission pattern" for the case where the "user" is "single" in the lighting pattern table 111. When the administrator operates the "close" button 122 on the administrator setting screen 120B, the display controller 103 displays the administrator setting screen 120C illustrated in FIG. 4C on the operation display unit 12.

The administrator setting screen 120C illustrated in FIG. 4C is associated with the multiple job pattern. As in FIG. 4B, on the administrator setting screen 120C, any light emission pattern from among "lit", "fast flashing", "slow flashing", and "breathing" may be selected using the radio button 121.

When the administrator selects any one of the light emission patterns on the administrator setting screen 120C, the setting unit 100 records the selected light emission pattern as a "light emission pattern" for the case where the "user" is "multiple" in the lighting pattern table 111.

(2) Operation at Time when Print Job is Executed

Figure 9:
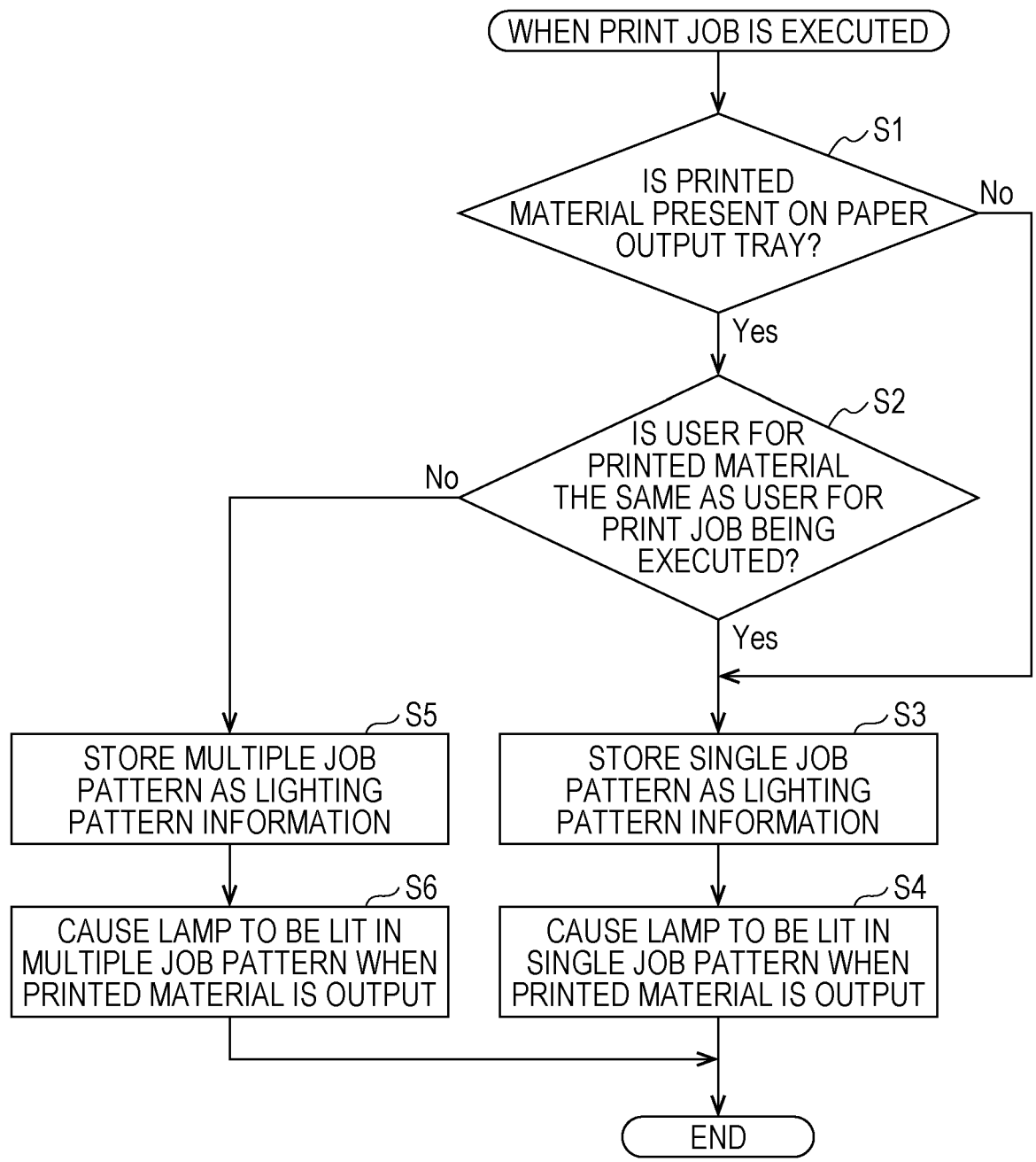
FIG. 9 is a flowchart illustrating an example of an operation of an image forming apparatus at the time when executing a print job.

Next, an example of an operation of the image forming apparatus 1 at the time when executing a print job will be explained with reference to a flowchart of FIG. 9. Hereinafter, a print job will be explained as a print job for printing.

When the receiver 101 receives a print job for printing from an external apparatus via the network 15A and the network communication unit 16A, the receiver 101 acquires a user ID from the print job and notifies the turn-on controller 104 of the user ID.

The execution unit 102 starts to execute the print job received by the receiver 101. That is, the execution unit 102 controls the image forming unit 14 to print image data included in the print job onto paper and output a printed material P. The image forming unit 14 prints the image data onto the paper and outputs the printed material P to the paper output tray 22a.

The turn-on controller 104 determines, based on whether or not a detection signal has been transmitted from the paper sensor 24, whether or not a printed material P is present on the paper output tray 22a (S1).

In the case where a detection signal has been transmitted (S1: Yes), the turn-on controller 104 determines whether a user for a printed material is the same as a user for a printed job being executed (S2). That is, the turn-on controller 104 determines, based on whether or not the last user ID notified from the receiver 101 is the same as the currently notified user ID, whether or not these users are the same.

In the case where it is determined that these users are the same (S2: Yes), the turn-on controller 104 stores the single job pattern as the lighting pattern information 112 into the memory 11 (S3).

When receiving an output signal from the execution unit 102, the turn-on controller 104 transmits the first turn-on signal corresponding to the single job pattern stored as the lighting pattern information 112 to the turn-on circuit 17. The turn-on circuit 17 causes the lamp 23 to be lit in the single job pattern corresponding to the first turn-on signal (S4). The first light emission part 23a of the lamp 23 is lit in yellow.

In the case where it is determined in step S2 that these users are not the same (S2: No), the turn-on controller 104 stores the multiple job pattern as the lighting pattern information 112 into the memory 11 (S5).

When receiving the output signal from the execution unit 102, the turn-on controller 104 transmits the second turn-on signal corresponding to the multiple job pattern stored as the lighting pattern information 112 to the turn-on circuit 17. The turn-on circuit 17 causes the lamp 23 to be lit in the multiple job pattern corresponding to the second turn-on signal (S6). The second light emission unit 23b of the lamp 23 is lit in blue.

In the case where the receiver 101 receives a print job for e-mail, the receiver 101 acquires an e-mail address from the print job. Furthermore, in the case where the receiver 101 receives a print job for facsimile, the receiver 101 acquires a telephone number from the print job. The receiver 101 notifies the turn-on controller 104 of the e-mail address or the telephone number. The turn-on controller 104 determines, based on the e-mail address or the telephone number, whether or not these users are the same.

(3) Operation after Print Job is Executed

Figure 10:
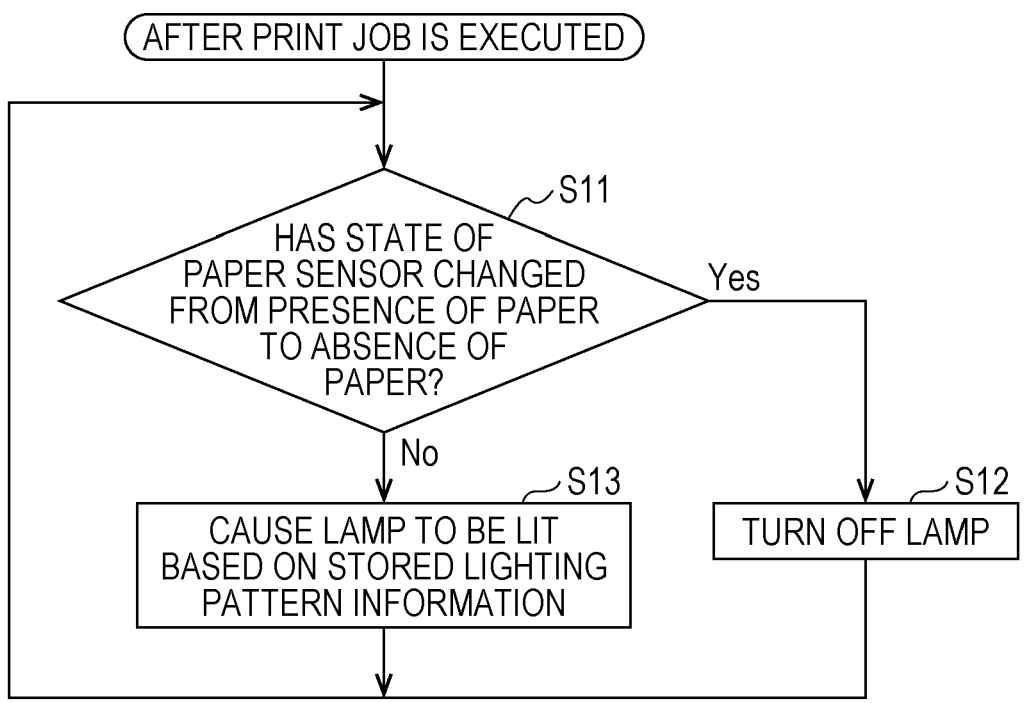
FIG. 10 is a flowchart illustrating an example of an operation of an image forming apparatus after a print job is executed.

Next, an example of an operation of the image forming apparatus 1 after a print job is executed will be explained with reference to a flowchart of FIG. 10.

The turn-on controller 104 determines a detection state of the paper sensor 24 (S11). In the case where the detection state of the paper sensor 24 has changed from presence of paper to absence of paper, for example, in the case where a user has collected a printed material P from the paper output tray 22a, the turn-on controller 104 controls the turn-on circuit 17 to turn off the lamp 23 (S12).

In the case where the detection state of the paper sensor 24 has changed from absence of paper to presence of paper, for example, in the case where, after a user has collected all the printed materials P from the paper output tray 22a, printed materials P other than a printed material P for the user are returned to the paper output tray 22a or a new print job is generated and a new printed material P is output to the paper output tray 22a, the turn-on controller 104 performs control such that the lamp 23 is lit based on the lighting pattern information 112 stored in the memory 11 (S13).

(4) Specific Operations

Next, specific operations will be explained with reference to FIGS. 5 to 8. Hereinafter, print jobs are assigned job IDs, Job 1, Job 2, Job 3, and so on in order of reception. Furthermore, as the lighting pattern information 112, the single job pattern is stored as default. A printed material Pa represents a printed material for a user A, and a printed material Pb represents a printed material for a user B.

(a) Case 1

Figure 5:
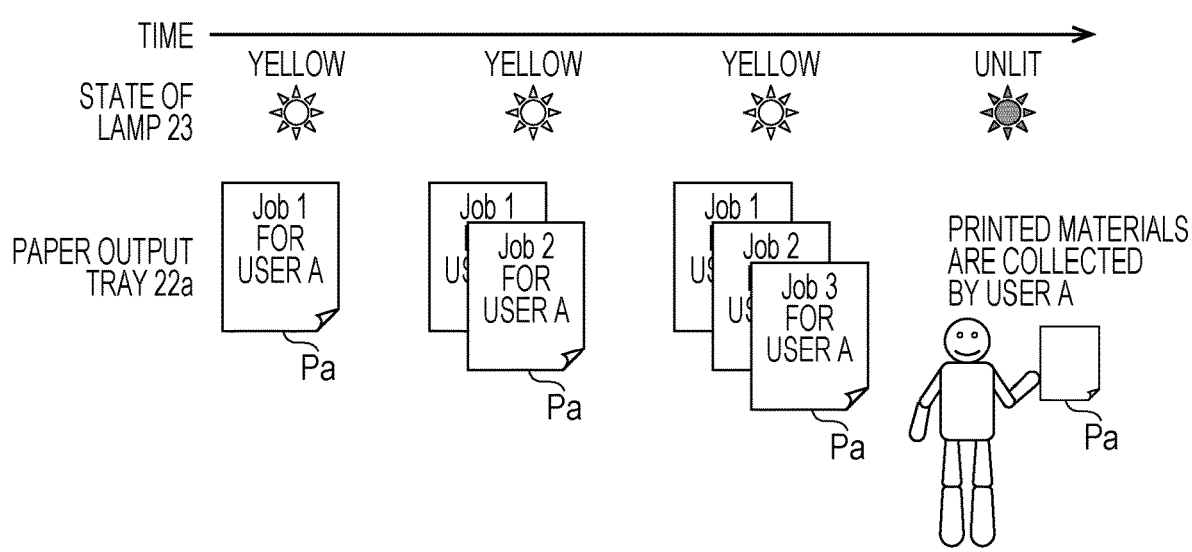
FIG. 5 is a diagram illustrating an example of a change of a lighting pattern in a case where print jobs for the same user are generated in a consecutive manner.

Case 1 represents a case where print jobs for the same user are generated in a consecutive manner. In this case, as illustrated in FIG. 5, the lamp 23 is lit in yellow in the single job pattern when a printed material Pa for the first print job (Job 1) is output, and the lamp 23 is also lit in yellow when a printed material Pa for the second print job (Job 2) and a printed material Pa for the third print job (Job 3) are output (S4). When the user A notices the lamp 23 lit in yellow and collects the printed materials Pa from the paper output tray 22a, the paper sensor 24 detects absence of paper (S11), and the lamp 23 then turns off (S12).

(b) Case 2

Figure 6:
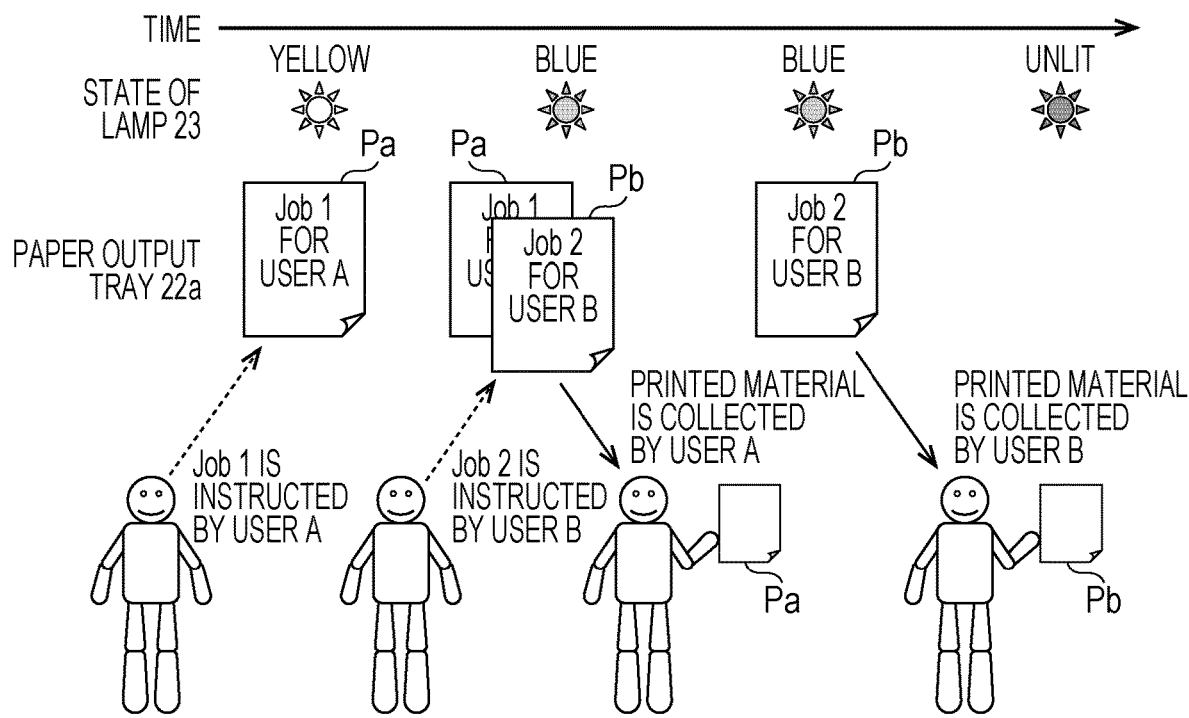
FIG. 6 is a diagram illustrating an example of a change of a lighting pattern in a case where print jobs for two users are generated in a consecutive manner.

Case 2 represents a case where after print jobs for two users are generated in a consecutive manner, part of printed materials are picked up. In this case, as illustrated in FIG. 6, in the case where a print job (Job 1) for the user A is generated and a print job (Job 2) for the user B is then generated, when a printed material Pa for the first print job (Job 1) is output, the lamp 23 is lit in yellow in the single job pattern (S4), and when a printed material Pb for the second print job (Job 2) is output, the lamp 23 is lit in blue in the multiple job pattern (S6). The user A sees the lamp 23 lit in blue, which indicates that printed materials for multiple users have been output, and collects only the printed material Pa for the user A, out of the two printed materials Pa and Pb. At this point in time, all the printed materials have not been collected, and the lamp 23 thus remains lit in blue. Next, when the user B has collected the printed material Pb for the user B, all the printed materials have been picked up from the paper output tray 22a (S11), and the lamp 23 then turns off (S12).

(c) Case 3

Figure 7:
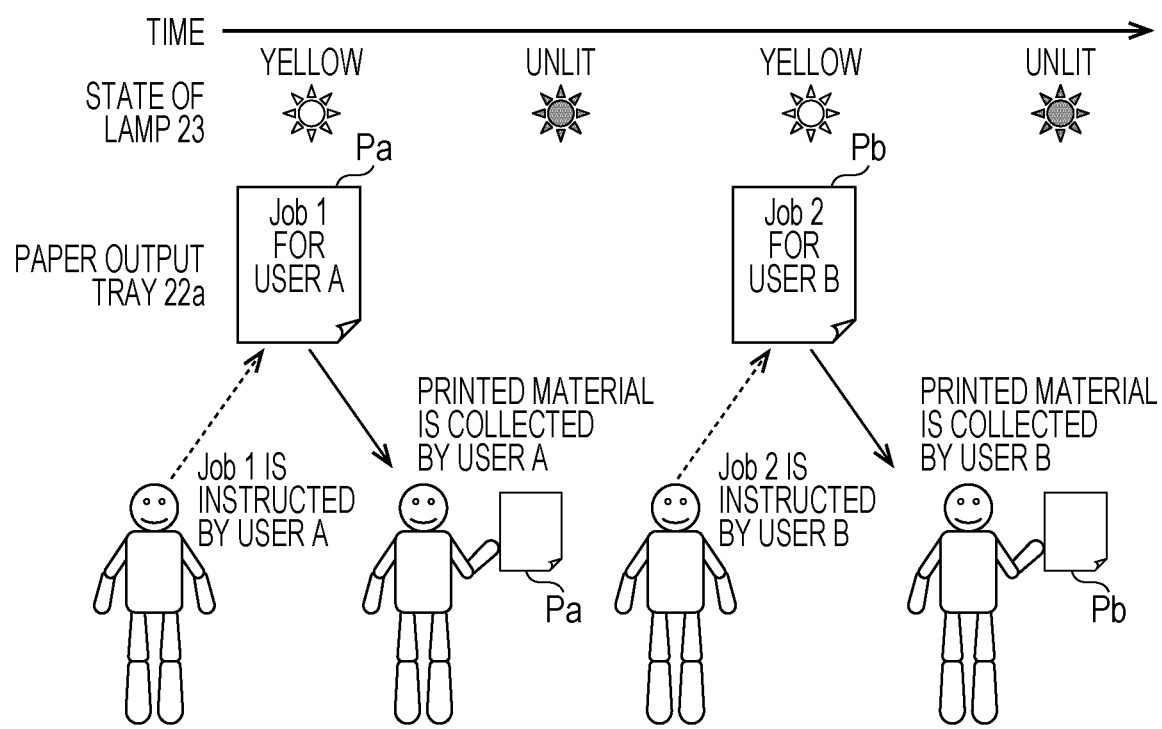
FIG. 7 is a diagram illustrating an example of a change of a lighting pattern in a case where print jobs for two users are generated with breaks.

Case 3 represents a case where print jobs for two users are generated with breaks. In this case, as illustrated in FIG. 7, a print job (Job 1) for the user A is generated. When the printed material Pa is output, the lamp 23 is lit in yellow in the single job pattern (S4). When the user A has collected the printed material Pa for the user A, the lamp 23 turns off (S12).

Next, a print job (Job 2) for the user B is generated. When the printed material Pb is output, the lamp 23 is lit in yellow in the single job pattern (S4). When the user B has collected the printed material P for the user B, the lamp 23 turns off (S12). At the time when the printed material Pb for the user B is output, other printed materials have yet to be output to the paper output tray 22a. Therefore, the lamp 23 is lit in the single job pattern.

(d) Case 4

Figure 8:
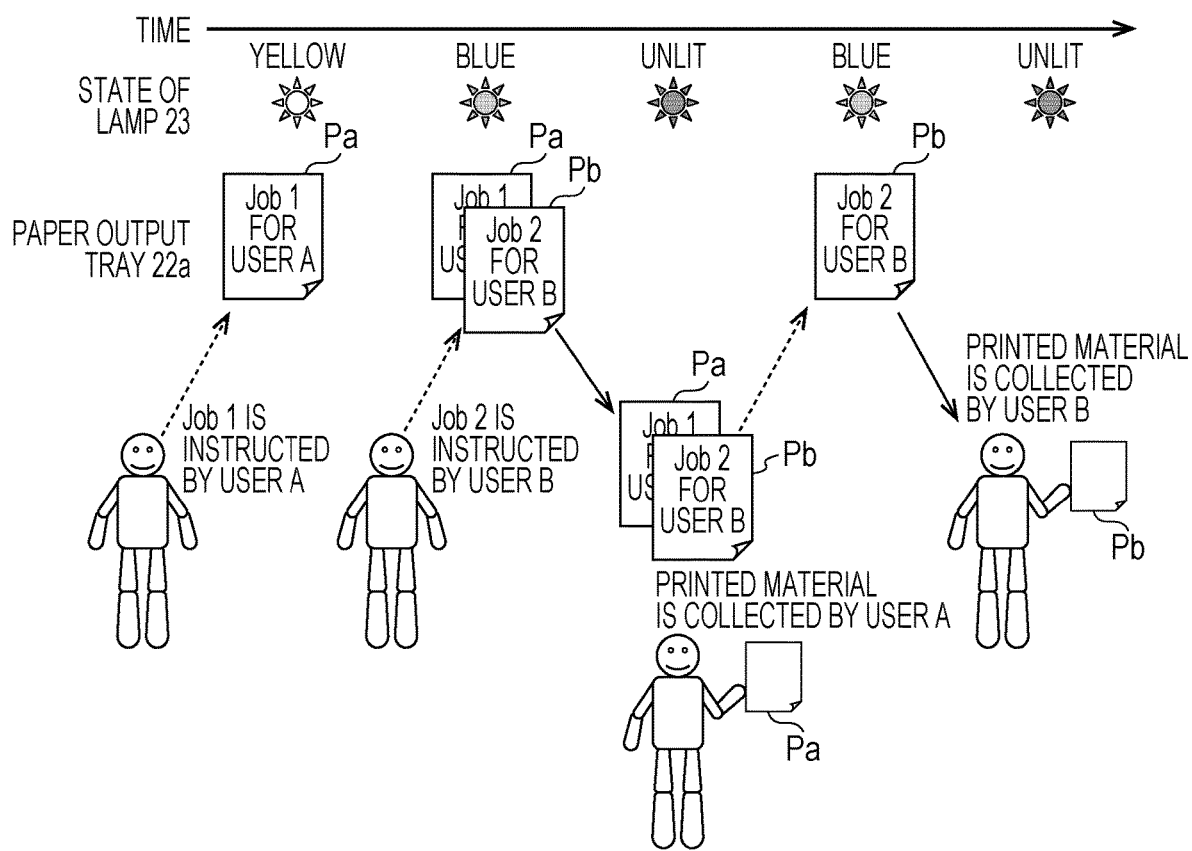
FIG. 8 is a diagram illustrating an example of a change of a lighting pattern in a case where print jobs for two users are generated in a consecutive manner.

Case 4 represents a case where print jobs for two users are generated in a consecutive manner and then all the printed materials are picked up. In this case, as illustrated in FIG. 8, a print job (Job 1) for the user A is generated, and a print job (Job 2) for the user B is then generated. When a printed material Pa for the first print job (Job 1) is output, the lamp 23 is lit in yellow in the single job pattern (S4). When a printed material Pb for the second print job (Job 2) is output, the lamp 23 is lit in blue in the multiple job pattern (S6).

The user A sees the lamp 23 lit in blue, which indicates that the printed materials Pa and Pb for the multiple users have been output, and collects all the printed materials Pa and Pb. At this time, the lamp 23 turns off (S12). The user A returns the printed material Pb for another person, out of the collected printed materials Pa and Pb, to the paper output tray 22a. At this time, the turn-on controller 104 causes the lamp 23 to be lit in blue in the lighting pattern before the lamp 23 is turned off, that is, in the multiple job pattern stored as the lighting pattern information 112 in the memory 11 (S5 and S6). The image forming apparatus 1 is not able to determine whether only the printed material Pb has been returned or all the printed materials Pa and Pb have been returned. Therefore, by taking into consideration the possibility that all the printed materials Pa and Pb have been returned, the lamp 23 is lit in the multiple job pattern. When the user B has collected the printed material Pb for the user B, the lamp 23 turns off (S12).

Second Exemplary Embodiment

Figure 11:
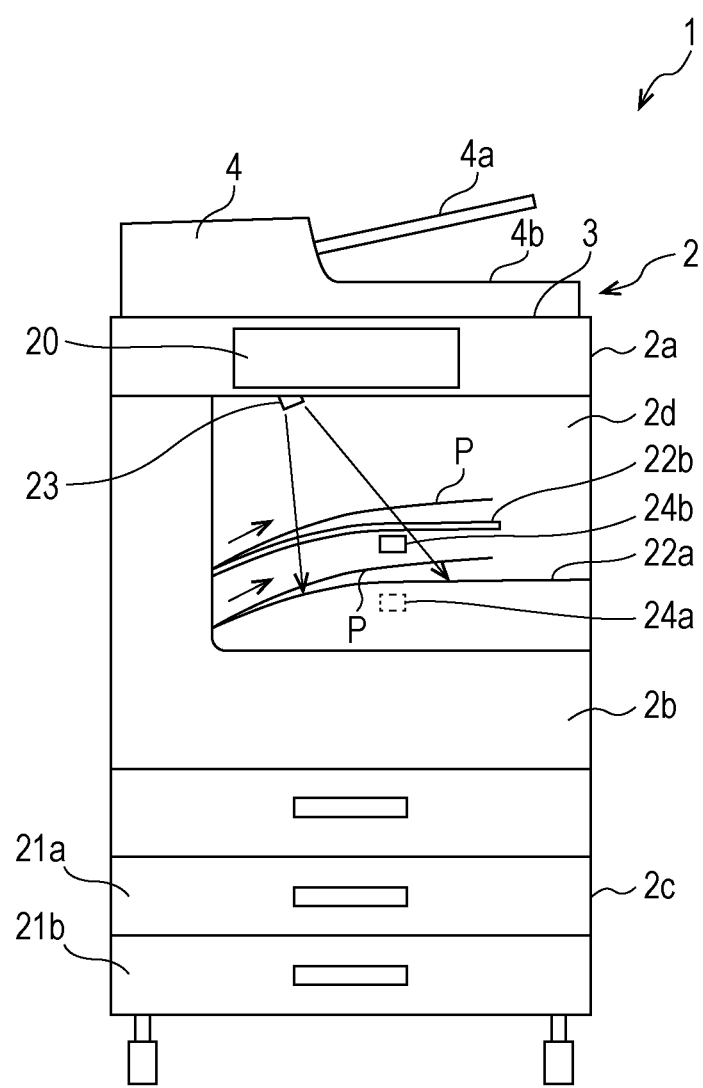
FIG. 11 is an external view illustrating a schematic configuration example of an image forming apparatus according to a second exemplary embodiment of the present disclosure.

FIG. 11 is an external view illustrating a schematic configuration example of an image forming apparatus according to a second exemplary embodiment of the present disclosure. In the first exemplary embodiment, the single paper output tray 22*a* and the single paper sensor 24 are provided. However, in the second exemplary embodiment, paper output trays 22*a* and 22*b* and paper sensors 24*a* and 24*b* that detect printed materials P output to the corresponding paper output trays 22*a* and 22*b* are provided. The other configuration features in the second exemplary embodiment are the same as those in the first exemplary embodiment. Explanation for differences from the first exemplary embodiment will be focused on.

The paper output trays 22*a* and 22*b* are assigned tray numbers. For example, the paper output tray 22*a*, which is a lower paper output tray, is assigned a tray number "01", and the paper output tray 22*b*, which is an upper paper output tray, is assigned a tray number "02". A tray number is an example of identification information of an output tray.

The paper output tray 22*b*, which is added in the second exemplary embodiment, is made of a transparent or semi-transparent material. Accordingly, light emitted from the lamp 23 is able to transmit through the upper paper output tray 22*b* to illuminate the lower paper output tray 22*a*.

Figure 12:
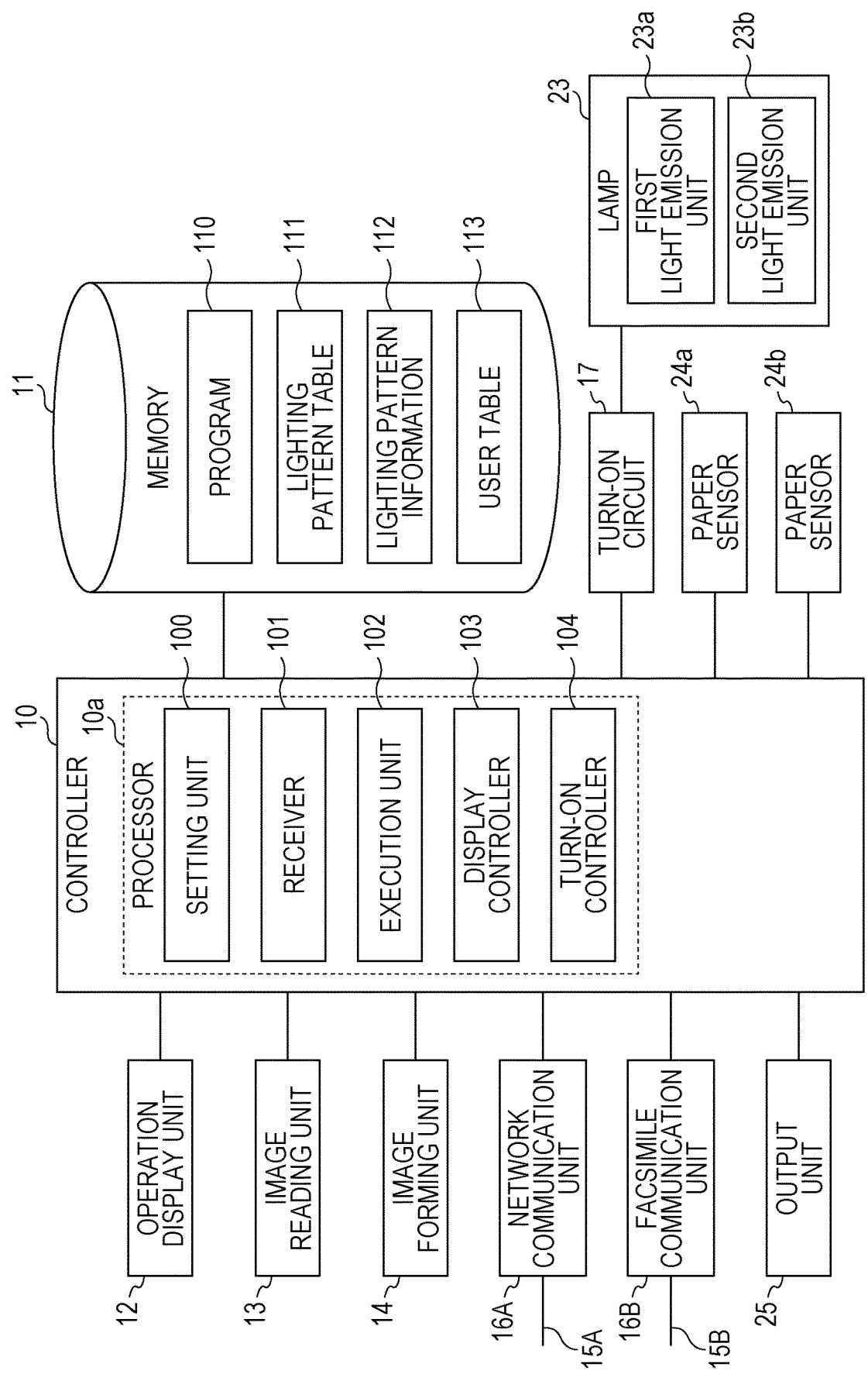
FIG. 12 is a block diagram illustrating an example of a control system of the image forming apparatus according to the second exemplary embodiment.

FIG. 12 is a block diagram illustrating an example of a control system of the image forming apparatus 1. The image forming apparatus 1 includes, as in the first exemplary embodiment, the controller 10. The memory 11, the operation display unit 12, the image reading unit 13, the image forming unit 14, the network communication unit 16A, the facsimile communication unit 16B, and the turn-on circuit 17 are connected to the controller 10. The paper sensors 24*a* and 24*b* are also connected to the controller 10.

In the memory 11, as in the first exemplary embodiment, the program 110, the lighting pattern table 111 (see FIG. 3), and the lighting pattern information 112 are stored. Furthermore, a user table 113 (see FIG. 13) is also stored in the memory 11.

Figure 13:
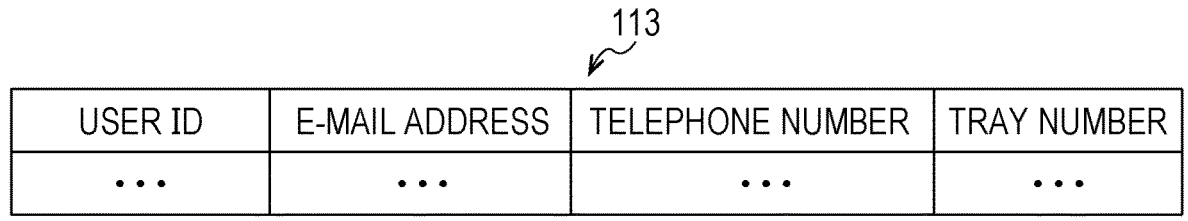
FIG. 13 is a diagram illustrating an example of a user table.

FIG. 13 is a diagram illustrating an example of the user table 113. The user table 113 includes items such as "user ID", "e-mail address", "telephone number", and "tray number". As the "user ID", a user ID allocated to a terminal or a user who has issued an instruction for a print job is recorded. As the "e-mail address" and the "telephone number", an e-mail address and a telephone number are recorded. As the "tray number", a tray number of the lower paper output tray 22*a* or the upper paper output tray 22*b* is recorded. The user table 113 is recorded by a user or an administrator.

The receiver 101 receives, as in the first exemplary embodiment, a print job for printing or e-mail transmitted from an external apparatus via the network 15A and the network communication unit 16A or a print job for facsimile transmitted from an external apparatus via the public network 15B and the facsimile communication unit 16B. The receiver 101 acquires a user ID, an e-mail address, or a telephone number for a printed material P based on a received print job. The receiver 101 notifies the turn-on controller 104 of the acquired user ID, e-mail address, or telephone number.

In the case where a print job for printing is received, the receiver 101 acquires a tray number from the print job. In the case where a print job for e-mail or facsimile is received, the receiver 101 acquires an e-mail address or a telephone number from the print job, and acquires a tray number corresponding to the e-mail address or the telephone number by referring to the user table 113. The receiver 101 notifies the execution unit 102 and the turn-on controller 104 of the tray number.

The execution unit 102 controls the image forming unit 14 to execute a print job received by the receiver 101, as in the first exemplary embodiment. At the time when outputting paper on which printing has been performed by the image forming unit 14 to the paper output tray 22*a* or 22*b*, the execution unit 102 transmits an output signal indicating that the paper has been output to the paper output tray 22*a* or 22*b* to the turn-on controller 104. Furthermore, the execution unit 102 performs control such that the paper on which printing has been performed is output to the paper output tray 22*a* or 22*b* corresponding to the tray number notified by the receiver 101.

When the output signal is transmitted from the execution unit 102, the turn-on controller 104 transmits the first turn-on signal corresponding to the single job pattern to the turn-on circuit 17 in the case where a printed material of a print job for a single user has been output to the lower paper output tray 22*a* or the upper paper output tray 22*b*, based on the user ID, the e-mail address, or the telephone number and the tray number notified by the receiver 101, and the turn-on controller 104 transmits the second turn-on signal corresponding to the multiple job pattern to the turn-on circuit 17 in the case where printed materials of print jobs for multiple users have been output.

(a) Case 1

Figure 14:
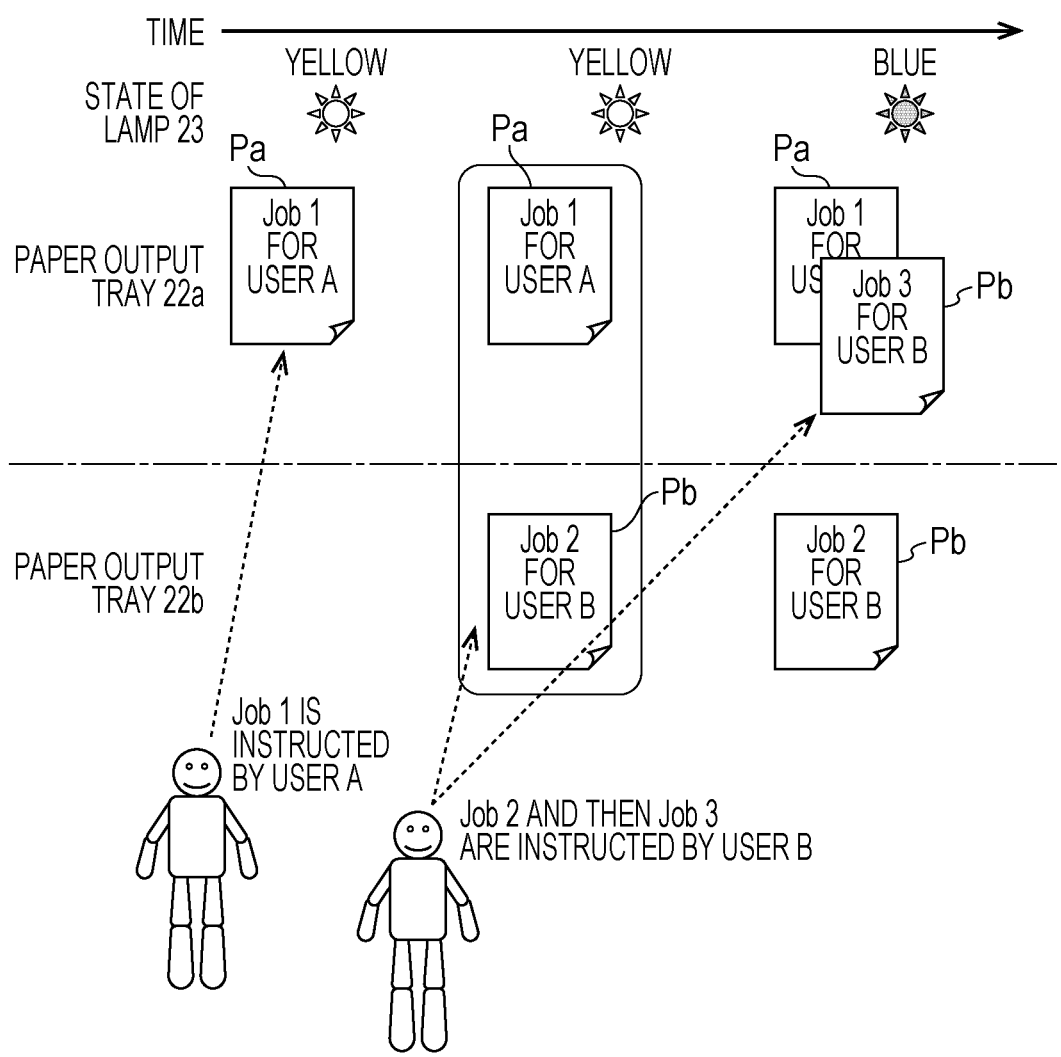
FIG. 14 is a diagram illustrating an example of a change of a lighting pattern.

A case where print jobs for two users are generated in a consecutive manner is illustrated in FIG. 14. A print job (Job 1) for the user A is generated. When a printed material Pa for the print job (Job 1) is output to the lower paper output tray 22*a*, the lamp 23 is lit in yellow in the single job pattern.

Next, the first print job (Job 2) for the user B is generated. When a printed material Pb for the print job (Job 2) is output to the upper paper output tray 22*b*, the lamp 23 is lit in yellow in the single job pattern. In this case, the printed materials Pa and Pb for two people are output. However, because the printed materials Pa and Pb are output to the different paper output trays 22*a* and 22*b*, the lamp 23 is lit in the single job pattern.

Next, the second print job (Job 3) for the user B is generated. When a printed material Pb for the print job (Job 3) is output to the lower paper output tray 22*a*, the lamp 23 is lit in blue in the multiple job pattern. As described above, the multiple printed materials Pa and Pb for different users are output to the single paper output tray 22*a*. Therefore, the lamp 23 is lit in the multiple job pattern.

(b) Case 2

Figure 15:
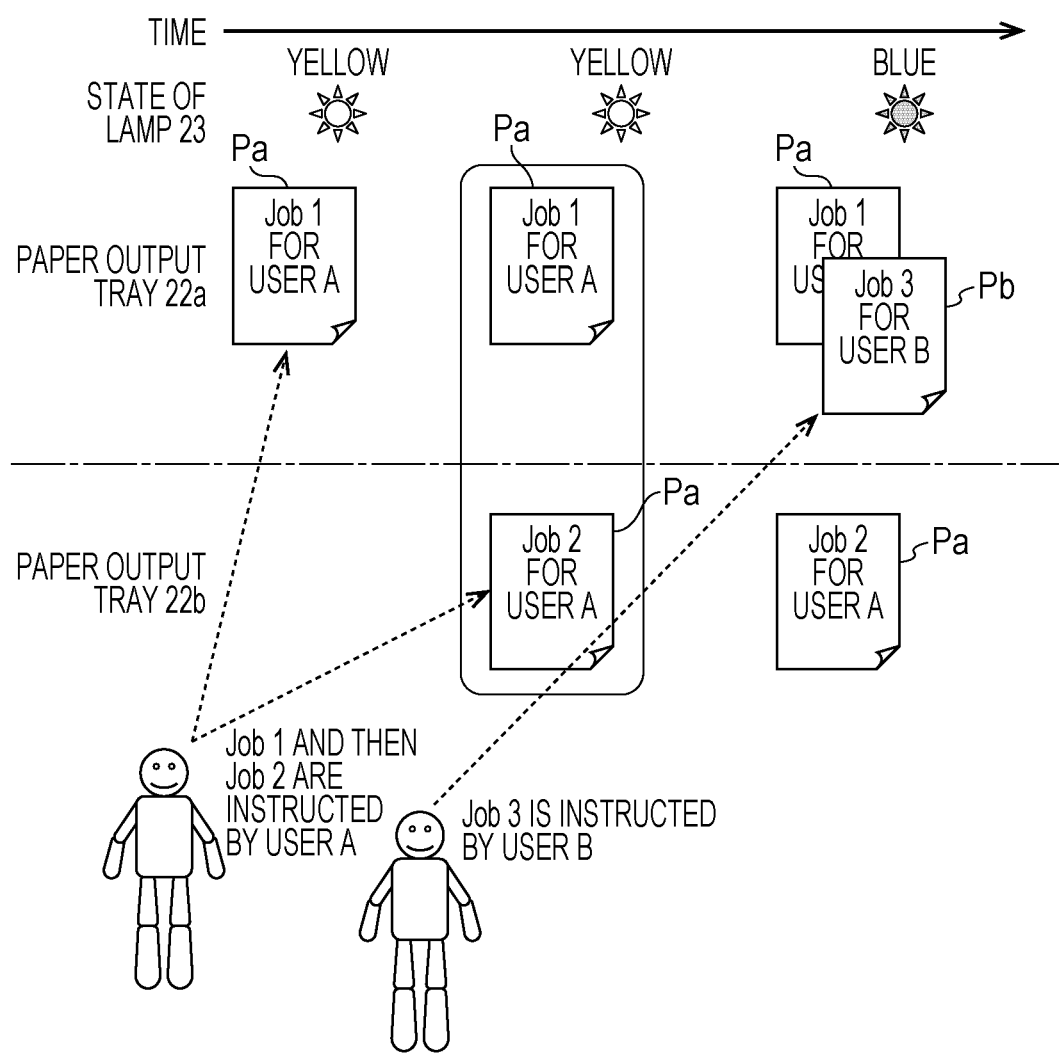
FIG. 15 is a diagram illustrating an example of a change of a lighting pattern.

A case where print jobs for two users are generated in a consecutive manner is illustrated in FIG. 15. A print job (Job 1) for the user A is generated. When a printed material Pa for the print job (Job 1) is output to the lower paper output tray 22*a*, the lamp 23 is lit in yellow in the single job pattern.

Then, the second print job (Job 2) for the user A is generated. When a printed material Pb for the print job (Job 2) is output to the upper paper output tray 22*b*, the lamp 23 is lit in yellow in the single job pattern.

Next, a print job (Job 3) for the user B is generated. When a printed material Pb for the print job (Job 3) is output to the lower paper output tray 22*a*, the lamp 23 is lit in blue in the multiple job pattern. As described above, the multiple printed materials Pa and Pb for different users are output to the single paper output tray 22*a*. Therefore, the lamp 23 is lit in the multiple job pattern.

(First Modification)

In each of the exemplary embodiments described above, when the paper sensor 24 does not detect printed material P, the lamp 23 turns off. However, the lamp 23 may turn off when a turn-off button is operated. A user of the image forming apparatus 1 may be guided in advance in a user's manual or the like to turn off the lamp 23 with the turn-off button when all the printed materials have been picked up from output trays. An operation on the turn-off button is an example of an operation indicating that all the printed materials have been picked up from an output tray. The turn-off button may be provided at, for example, the upper part 2a of the image forming apparatus 1 or the operation display unit 12.

Furthermore, for example, in the case where a user who has picked up all the printed materials from an output tray turns off the lamp 23 with the turn-off button and then returns a printed material to the output tray, the user may operate a re-turn on button to re-turn on the lamp 23. A re-lighting pattern in this case is the same as the lighting pattern at the time before the lamp 23 is turned off. The re-turn on button may be, for example, provided at the upper part 2a of the apparatus body 2 or the operation display unit 12. The re-turn on button may be a turn-off/re-turn on button that also serves as a turn-off button. The turn-off/re-turn on button functions as a turn-off button at the first operation, and functions as a re-turn on button at the next operation. The turn-off/re-turn on button repeats these functions alternately.

(Second Modification)

The image forming apparatus 1 may be shifted from a normal mode to a power-saving mode with a reduced power consumption in the case where a predetermined condition is satisfied. The predetermined condition may be, for example, that a state in which the image forming apparatus 1 is not used lasts for a predetermined time, that a predetermined time has been reached, that an instruction for shifting to the power-saving mode is explicitly issued by a user, or the like.

In the case where, after a printed material is output, when the image forming apparatus 1 is shifted to the power-saving mode with the lamp 23 remained lit, that is, in the case where the power-saving mode is entered while the printed material is left on an output tray, the lamp 23 may be turned off. After that, when recovery from the power-saving mode to the normal mode occurs, the lamp 23 may be lit in the same lighting pattern as that immediately before the turning off. Only part of the printed materials left on an output tray may be picked up during the power-saving mode. However, it is difficult for the image forming apparatus 1 to determine whether only part of the printed materials has been picked up. Therefore, the possibly of a situation in which some of the printed materials remain on the output tray is taken into account. If the lighting pattern immediately before turning off is the multiple job pattern, the multiple job pattern is set after recovery. However, increasing the number of printed materials on an output tray during the power-saving mode is less likely to occur. Therefore, in the case where the lighting pattern immediately before turning off is the single job pattern, the single job pattern may be set after recovery.

For example, recovery from the power-saving mode to the normal mode occurs in the following cases:
 (1) when a period for execution of the power-saving mode ends; and
 (2) when the image forming apparatus 1 starts to be used.

These cases may include, for example, a case where a human sensor such as a Doppler sensor or an infrared sensor, a load sensor arranged on the floor, or the like detects that a user has approached the image forming apparatus 1, a case where the operation display unit 12 is operated, a case where a document is arranged on the platen 3, and the like. When the recovery from the power-saving mode to the normal mode occurs, the lamp 23 may be lit in the same lighting pattern as that immediately before turning off on the condition that a printed material P is detected by the paper sensor 24. In other words, if a printed material P is not detected by the paper sensor 24 when the recovery from the power-saving mode to the normal mode occurs, the lamp 23 may remain unlit.

(Third Modification)

The image forming apparatus 1 may include a plurality of paper output trays 22, and the common lamp 23 may be used for the plurality of paper output trays 22. The output unit 25 outputs a printed material P to one of the plurality of paper output trays 22.

The processor 10a may control the lamp 23 to be lit in such a manner that, irrespective of which one of the plurality of paper output trays 22 a printed material has been output to, a case where a printed material of a print job for a single user has been output and a case where printed materials of print jobs for multiple users have been output are able to be distinguished from each other.

(Fourth Modification)

The image forming apparatus 1 may include a plurality of paper output trays 22, and lamps 23 may be provided for the individual paper output trays 22. The output unit 25 outputs a printed material P to one of the plurality of paper output trays 22.

The processor 10a may perform control, for each of the paper output trays 22, such that a corresponding lamp 23 is lit in such a manner that a case where a printed material P of a print job for a single user has been output to the paper output tray 22 and a case where printed materials P of print jobs for multiple users have been output to the paper output tray 22 are able to be distinguished from each other.

(Fifth Modification)

In the example illustrated in FIG. 5, even when multiple print jobs for the same user are generated in a consecutive manner, the lamp 23 is lit in the same lighting pattern. However, the user is not able to know when printed materials Pa were output. In a fifth modification, in the case where multiple print jobs for the same user are generated in a consecutive manner, the lamp 23 is lit in different lighting patterns for individual print jobs.

Figure 16:
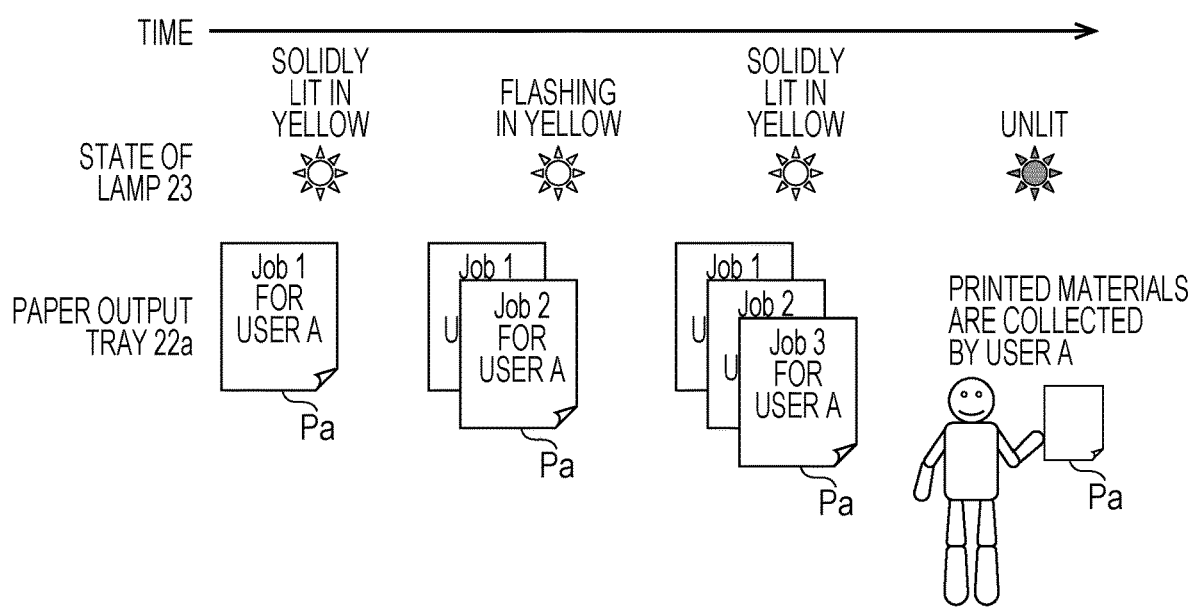
FIG. 16 is a diagram illustrating an example of a change of a lighting pattern.

In the case where print jobs for the same user are generated in a consecutive manner, as illustrated in FIG. 16, when a printed material Pa for the first print job (Job 1) is output, the lamp 23 is lit in yellow in the single job pattern (solidly lit). When a printed material Pa for the second print job (Job 2) is output, the lamp 23 flashes in yellow indicating the second time in the single job pattern.

When a printed material Pa for the third print job (Job 3) is output, the lamp 23 is lit in yellow (solidly lit). The user A is able to be notified, by the lamp 23 flashing in yellow, that the second printed material has been output and, by the lamp 23 solidly lit in yellow, that the third printed material has been output.

(Sixth Modification)

In the example illustrated in FIG. 14, even if printed jobs for two users are generated in a consecutive manner, because printed materials Pa and Pb are output to different destinations, the lamp 23 is lit in yellow in the single job pattern. In this case, if a user does not remember where a printed material is to be output, the user may incorrectly pick up printed materials Pa and Pb for different users. To reduce the possibility of incorrect pickup, the lamp 23 may be caused to flash in yellow, and the user may be notified that printed materials Pa and Pb for multiple users have been output to different output destinations.

(Seventh Modification)

In the example illustrated in FIG. 14, irrespective of whether print jobs for two users are generated in a consecutive manner and printed materials Pa and Pb for the print jobs have been output to one of output destinations or output to both the output destinations, the lamp 23 is lit in blue in the multiple job pattern. Even in this case, a user may incorrectly pick up printed materials Pa and Pb for different users. To reduce the possibility of incorrect pickup, the lamp 23 may be lit in blue in the case where multiple printed materials Pa and Pb have been output to one of the output destinations, and the lamp 23 may flash in blue in the case where the multiple printed materials Pa and Pb have been output to both the output destinations.

(Eighth Modification)

In the example illustrated in FIG. 8, in the case where all the printed materials Pa and Pb for two users have been collected from the paper output tray 22a and the detection state of the paper sensor 24 has changed from presence of paper to absence of paper, the lamp 23 immediately turns off. After that, the printed material Pb is returned to the paper output tray 22a, and the lamp 23 is lit in the same lighting pattern as that immediately before the turning off. It generally takes only a short period of time to collect all the printed materials and return part of the printed materials. Therefore, in the case where paper is not detected by the paper sensor 24 even after a certain period of time has passed since no detection of paper by the paper sensor 24, the lamp 23 may turn off.

(Ninth Modification)

In the case where a print job for e-mail or facsimile is generated, for example, print jobs for facsimile from Company A and Company B with different caller numbers may be collectively received by staff in Department X and print jobs from Company C may be received by staff in Department Y. To handle such a case, a function for forming e-mail addresses or caller numbers of transmission sources into groups may be provided. Determination of whether print jobs are generated for a single user or multiple users may be made by regarding users in the same group as the same user (in the example mentioned above, Company A and Company B are regarded as a single user), and the lamp may be lit in the single job pattern or the multiple job pattern.

Exemplary embodiments of the present disclosure have been described above. However, the exemplary embodiments are not limited to the exemplary embodiments described above. Various changes and implementations may be made without departing from the scope of the present disclosure.

Part of or the entire components of the processor 10a may be configured as a hardware circuit such as a field programmable gate array (FPGA), an application specific integrated circuit (ASIC), or the like.

Furthermore, part of components in the exemplary embodiments described above may be omitted or changed without departing from the scope of the present disclosure. In the flow of processes in the exemplary embodiments of the present disclosure, addition, deletion, change, exchange, and the like of steps may be performed without departing from the scope of the present disclosure. Programs used in the exemplary embodiments may be recorded in a computer-readable recording medium such as a compact disc-read only memory (CD-ROM) and provided. The programs may be stored in an external server such as a cloud server and used via a network.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
an image forming unit that creates a printed material by forming an image on paper;
an output unit that outputs the printed material to an output tray;
a light source that is provided such that lit light is viewable from outside the image forming apparatus; and
a processor configured to
receive a print job for creating the printed material by the image forming unit, and
perform control such that the light source is lit in a first lighting pattern in a case where a printed material of a print job for a single user has been output to the output tray and the light source is lit in a second lighting pattern in a case where printed materials of print jobs for multiple users have been output to the output tray
wherein in a case where a power-saving mode is entered in a state in which an output printed material is present on the output tray, the processor performs control such that the light source that is lit is turned off, and after that, when recovery from the power-saving mode to a normal mode occurs, the processor performs control such that the light source is lit in any one of the first lighting pattern and the second lighting pattern that is a same lighting pattern as that immediately before the turning off.

2. The image forming apparatus according to claim 1,
wherein an upper part of the output tray is covered with part of the image forming apparatus, and
wherein the light source is provided to illuminate a printed material output to the output tray.

3. The image forming apparatus according to claim 2,
wherein in a case where it is detected that all printed materials have been picked up from the output tray, the processor performs control such that the light source is turned off, and after that, when it is detected that there is a printed material on the output tray although no printed material has been output since collection of all the printed materials from the output tray, the processor performs control such that the light source is lit in any one of the first lighting pattern and the second lighting pattern that is a same lighting pattern as that immediately before the turning off.

4. The image forming apparatus according to claim 2,
wherein the output tray is one of a plurality of output trays,
wherein the output unit outputs printed materials to the plurality of output trays, and
wherein the processor performs control such that the light source is lit in a first lighting pattern in a case where a printed material of a print job for a single user has been output to one of the plurality of output trays and the light source is lit in a second lighting pattern in a case where printed materials of print jobs for multiple users have been output to the one of the plurality of output trays.

5. The image forming apparatus according to claim 2,
wherein the output tray includes a plurality of output trays,
wherein the output unit outputs printed materials to the plurality of output trays, and
wherein the processor performs control such that, irrespective of which one of the plurality of output trays a printed material has been output to, the light source is lit in a first lighting pattern in a case where a printed material of a print job for a single user has been output and the light source is lit in a second lighting pattern in a case where printed materials of print jobs for multiple users have been output.

6. The image forming apparatus according to claim 2,
wherein the output tray includes a plurality of output trays,
wherein the output unit outputs printed materials to the plurality of output trays,
wherein the light source includes a plurality of light sources provided in association with the plurality of output trays, and
wherein the processor performs control, for each of the plurality of output trays, such that a corresponding one of the plurality of light sources is lit in a first lighting pattern in a case where a printed material of a print job for a single user has been output to the output tray and the light source is lit in a second lighting pattern in a case where printed materials of print jobs for multiple users have been output to the output tray.

7. The image forming apparatus according to claim 1, further comprising:
a detector that detects presence or absence of a printed material output to the output tray.

8. The image forming apparatus according to claim 2, further comprising:
a detector that detects presence or absence of a printed material output to the output tray.

9. The image forming apparatus according to claim 8,
wherein in a case where it is detected that all printed materials have been picked up from the output tray, the processor performs control such that the light source is turned off, and after that, when it is detected that there is a printed material on the output tray although no printed material has been output since collection of all the printed materials from the output tray, the processor performs control such that the light source is lit in any one of the first lighting pattern and the second lighting pattern that is a same lighting pattern as that immediately before the turning off.

10. The image forming apparatus according to claim 7,
wherein in a case where it is detected that all printed materials have been picked up from the output tray, the processor performs control such that the light source is turned off, and after that, when it is detected that there is a printed material on the output tray although no printed material has been output since collection of all the printed materials from the output tray, the processor performs control such that the light source is lit in any one of the first lighting pattern and the second lighting pattern that is a same lighting pattern as that immediately before the turning off.

11. The image forming apparatus according to claim 1,
wherein in a case where it is detected that all printed materials have been picked up from the output tray, the processor performs control such that the light source is turned off, and after that, when it is detected that there is a printed material on the output tray although no printed material has been output since collection of all the printed materials from the output tray, the processor performs control such that the light source is lit in any one of the first lighting pattern and the second lighting pattern that is a same lighting pattern as that immediately before the turning off.

12. The image forming apparatus according to claim 1,
wherein in a case where it is not detected that all the printed materials have been picked up from the output tray when recovery from the power-saving mode to the normal mode occurs, the processor performs control such that the light source is lit in any one of the first lighting pattern and the second lighting pattern that is a same lighting pattern as that immediately before the turning off.

13. The image forming apparatus according to claim 1,
wherein the output tray is one of a plurality of output trays,
wherein the output unit outputs printed materials to the plurality of output trays, and
wherein the processor performs control such that the light source is lit in a first lighting pattern in a case where a printed material of a print job for a single user has been output to one of the plurality of output trays and the light source is lit in a second lighting pattern in a case where printed materials of print jobs for multiple users have been output to the one of the plurality of output trays.

14. The image forming apparatus according to claim 13,
wherein the plurality of output trays include a first tray and a second tray;
wherein the output unit outputs printed materials to the first tray and the second tray, and
wherein the light source is provided to illuminate an output printed materials output to both the first tray and the second tray.

15. The image forming apparatus according to claim 1,
wherein the output tray includes a plurality of output trays,
wherein the output unit outputs printed materials to the plurality of output trays, and
wherein the processor performs control such that, irrespective of which one of the plurality of output trays a printed material has been output to, the light source is lit in a first lighting pattern in a case where a printed material of a print job for a single user has been output and the light source is lit in a second lighting pattern in a case where printed materials of print jobs for multiple users have been output.

16. The image forming apparatus according to claim 1, wherein the output tray includes a plurality of output trays,
wherein the output unit outputs printed materials to the plurality of output trays,
wherein the light source includes a plurality of light sources provided in association with the plurality of output trays, and
wherein the processor performs control, for each of the plurality of output trays, such that a corresponding one of the plurality of light sources is lit in a first lighting pattern in a case where a printed material of a print job for a single user has been output to the output tray and the light source is lit in a second lighting pattern in a case where printed materials of print jobs for multiple users have been output to the output tray.

17. A non-transitory computer readable medium storing a program causing a computer to execute a process for image formation, the process comprising:
creating a printed material by forming an image on paper;
outputting the printed material to an output tray;
causing lit light to be viewable from outside an image forming apparatus; and
receiving a print job for creating the printed material, and performing control such that a light source is lit in a first lighting pattern in a case where a printed material of a print job for a single user has been output to the output tray and the light source is lit in a second lighting pattern in a case where printed materials of print jobs for multiple users have been output to the output tray,
wherein in a case where a power-saving mode is entered in a state in which an output printed material is present on the output tray, the computer performs control such that the light source that is lit is turned off, and after that, when recovery from the power-saving mode to a normal mode occurs, the computer performs control such that the light source is lit in any one of the first lighting pattern and the second lighting pattern that is a same lighting pattern as that immediately before the turning off.

\* \* \* \* \*